Oct. 23, 1951     H. M. DAVIS     2,572,702
METHOD OF COOLING ENAMELED STEEL AFTER FIRING
Filed March 7, 1950
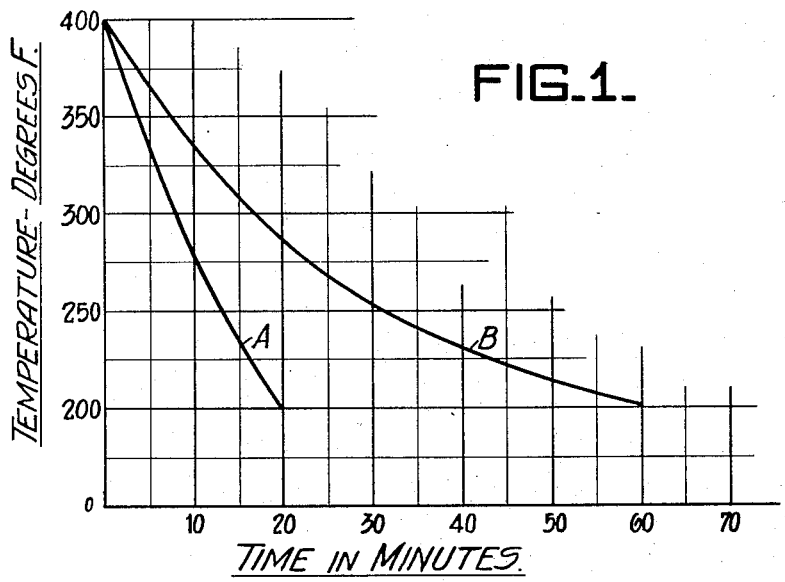
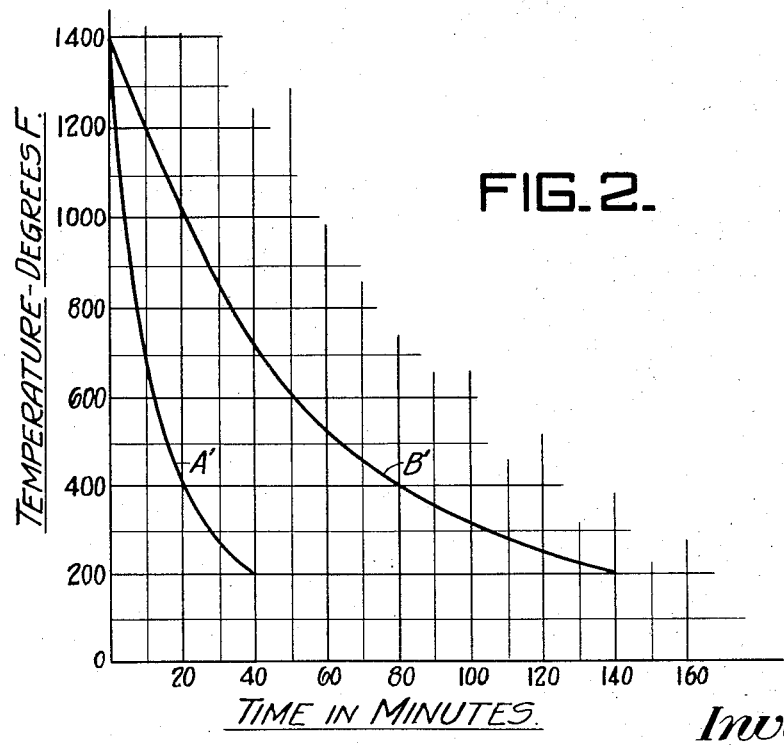
*Inventor:*
HENRY M. DAVIS,
by Donald G. Dalton
his Attorney.

Patented Oct. 23, 1951

2,572,702

UNITED STATES PATENT OFFICE 2,572,702

METHOD OF COOLING ENAMELED STEEL AFTER FIRING

Henry M. Davis, State College, Pa., assignor to United States Steel Company, a corporation of New Jersey Application March 7, 1950, Serial No. 148,229

3 Claims. (Cl. 117—103)

This invention relates to the art of vitreous enameling and, in particular, to the treatment of enameled steel ware after firing, to prevent the formation of defects such as have resulted heretofore from the accumulation of gas under the enamel surface.

It has long been known that surface defects in enameled ware developing during and after firing are caused by the evolution of gas. I have established that the gas responsible for what I term "delayed" defects, i. e., shiners, fish-scales, bloats or pop-offs occurring after firing, is principally hydrogen accumulating under the enamel. This hydrogen may originally have been occluded in the base metal during manufacture, or it may result from reaction of the iron with water in the dried, unfired enamel, either chemically or physically associated therewith. In any event, it has been practically impossible to prevent entirely the accumulation of hydrogen under the enamel in sufficient quantity to cause the development of delayed defects after the ware has been fired and cooled. Such defects cannot usually be remedied and necessitate scrapping of the ware at the final stage of manufacture which represents a considerable economic loss.

I have invented a process of treating enameled ware after firing which prevents the occurrence of defects such as those mentioned above. My invention is based on the principle of disposing of the hydrogen so that it cannot cause defects, since its presence at some stage of the process cannot be prevented. Generally speaking, the invention consists in cooling the ware after firing, at a controlled rate which permits precipitation of a part of the atomic hydrogen (which is dissolved in the steel at enameling temperature—1500° F.) and solution in the silicate glass produced by vitrification of the slip residue (that which remains of the dried slip when fusion temperature is reached), of the water formed by combination of much of the remainder of the hydrogen with oxygen from the surface of the base metal. More particularly, I retard the cooling of the ware through the range from 400° F. to 200° F. or below, to afford the time required for such precipitation and solution, which proceed rather slowly. In other words, much of the hydrogen which is present in the steel at enameling temperature is converted into water and the water is stored in the enamel layer by the time the ware cools to atmospheric temperature. In this way I prevent the excessive accumulation of hydrogen under the enamel which gives rise to delayed defects.

A complete understanding of the invention may be obtained from the following detailed explanation, which refers to the accompanying drawing showing curves exemplifying the preferred practice and a modification. In the drawings, Figure 1 is a time-temperature chart for the preferred practice; and Figure 2 is a similar chart for a modified practice.

The enameling of articles of steel as usually conducted involves the cleaning of the articles to remove scale, grease and other foreign matter, coating the articles with a slip of vitreous frit and a minor amount of clay and inorganic salts in water, drying the ware, and firing it at a temperature of from 1500 to 1550° F. to fuse and vitrify the slip residue. A dark-colored ground coat is usually applied first and then a light-colored or white finish coat is applied over all or part of the surface by a repetition of the coating and firing steps. Surface defects in the enamel layer may appear during firing or only after cooling and the lapse of a substantial period of time. I designate these "high-temperature defects" and "delayed defects," respectively. The present invention relates to the prevention of the delayed defects, which are largely the result of hydrogen evolution.

Enameling steel inevitably contains occluded hydrogen by reason of the acid pickling treatment to which it is subjected during manufacture. This hydrogen, substantially all of which is in molecular form at room temperature, is normally trapped in minute voids in the metal. At enameling temperature, a considerable fraction of it is dissociated into atomic form. In such form it is soluble in iron, the solubility increasing with temperature. In addition to the hydrogen occluded in the base metal, the water remaining in the dried slip, either combined chemically or merely absorbed, affords a further source of hydrogen by oxidation of iron, a process which may be represented by the following equations:

$$4H_2O + 3Fe \rightarrow Fe_3O_4 + 8H$$
$$H_2O + Fe \rightarrow FeO + 2H$$

Some of the water may first dissolve in the frit as it fuses, but the solubility of water in silicate glasses decreases with rising temperature, a fact which promotes reactions of the type shown above. In any event, it is not feasible to exclude hydrogen from the base metal or the enamel. My invention accordingly contemplates disposing of the hydrogen in a manner such that it will not cause surface defects.

As explained above, a considerable amount of atomic hydrogen is present in solution in the iron at the completion of the enamel firing, and naturally some of it is adjacent to the iron-enamel interface. With a supply of hydrogen available, the oxidation reactions given above are reversible at elevated temperatures somewhat lower than enameling temperatures. Conventional practice, however, involves rapid cooling of the enameled ware in air from firing temperature to room temperature in a matter of a few minutes, thus affording no adequate opportunity for reduction of the oxide on the metal surface by the atomic hydrogen. In addition, much of the hydrogen dissolved in the iron subsequently migrates slowly to any zones of imperfect contact in the iron-enamel interface, increasing the concentration of hydrogen there and eventually producing delayed defects.

I have discovered that, by control of the rate of cooling of enameled ware from the firing temperature at which the slip residue becomes fused and vitrified, the occurrence of delayed defects may be prevented. Specifically, the cooling from about 400° F. to about 200° F. should be effected gradually and slowly over a period of from 20 to 60 minutes, the required time varying with the nature of the steel and of the enamel. In a preferred practice of the invention, the ware is removed from the furnace after firing at from 1500 to 1550° F. and is placed in an enclosure heated to about 400° F. before natural radiation and convection have cooled the ware below that temperature. Thereupon the temperature of the ware in the enclosure is gradually reduced by suitable provision for cooling, at a rate within the range just stated, which is illustrated graphically in Figure 1. The retardation of the rate of cooling apparently affords opportunity for the hydrogen dissolved in the base metal to be evolved and combine with the metallic oxides at the metal surface and for the resulting water to enter into the silicate glass formed by fusion of the slip residue. This diminishes the amount of hydrogen left as such and lessens or eliminates the tendency for delayed defects to appear.

Figure 1 shows curves A and B corresponding respectively to the maximum and minimum rates of cooling defining the range given above. If the maximum rate (curve A) is exceeded, the tendency to develop delayed defects is not avoided with assurance. Cooling at a rate even slower than that indicated as the minimum (curve B) has no objectionable result but is not necessary and introduces no further visible improvement in the ware. Obviously the quickest cooling within the range which avoids defects is the most economical. A cooling curve falling between curves A and B will satisfactorily fulfill the requirements of my invention.

As a modification of the practice explained above, I may omit the initial rapid cooling to reduce the temperature from 1500 to 400° F. Instead, I may place the ware in an enclosure heated to about 1400° F. immediately on removing it from the enameling furnace, and then reduce the temperature of the ware in the enclosure gradually and continuously to about 200° F. in from 40 to 140 minutes. This practice has the advantage of easy performance but requires greater cooling capacity for a given output.

Figure 2 illustrates graphically the character of cooling effected by the modified procedure. As there shown, the ware is cooled relatively rapidly from about 1400° F. to about 400° F., after which it is cooled more slowly to 200° F. or below. Curve A' represents the maximum rate of cooling permissible to ensure avoidance of delayed defects and curve B' the minimum rate of cooling necessary for this purpose. A rate of cooling represented by a curve between the two will prove satisfactory.

The minimum time for the second stage of cooling which is necessary to avoid delayed defects varies considerably with the character of the enamel. A frit which forms a transparent enamel (the frit ordinarily used for ground coat but without the cobalt and nickel oxides present therein) is most sensitive to delayed defects because gas accumulations between such enamel and the base metal show up prominently as visible splotches even though the gas be insufficient to cause a discernible raised or puffed area (sometimes called a bloat), a fish-scale, a shiner, or a pop-off. Transparent enamel therefore requires a longer and slower cooling than a typical ground coat or an opaque or translucent enamel such as is used for white finish coat, although, for any enamel, the longer and slower the cooling from 400° to 200° F. and below, the greater is the assurance against subsequent development of delayed defects.

The minimum time for the second stage of cooling also varies with the nature of the cleaning operation to which the base metal is subjected before coating with enamel slip, being longer for articles which have been cleaned with acid (pickled) than those prepared by sand-blasting or other non-acid processes. This is probably the result of the further opportunity for absorption of hydrogen which is afforded by the acid cleaning operation. This is borne out by the fact that the cooling time for acid-cleaned ware may be safely shortened, the longer the time elapsing between cleaning and enameling.

The following summary of various examples of the practice of my invention will probably afford a better understanding thereof.

*Example I*

Sand-blasted panels of enameling steel were coated, some with slip giving a transparent enamel and some with slip giving the conventional white coat of enamel and, after drying, were fired at from 1500 to 1550° F. On removal from the enameling furnace, each panel was promptly placed in an enclosure heated to about 400° F. The temperature of the enclosure and the panels was then reduced to about 200° F. at various rates for different panels, after which they were cooled to room temperature in air. Delayed defects were entirely absent from panels coated with transparent enamel which received a second-stage cooling lasting at least 45 minutes and largely absent from those whose cooling continued only 30 minutes. Panels having the white enamel coat exhibited no delayed defects if cooled over a period of at least 20 minutes. Prolonging the cooling beyond 60 minutes showed no gain in freedom from delayed defects.

*Example II*

Panels were prepared and enameled as in Example I. Each panel after firing was removed from the furnace to an enclosure heated to about 1400° F. The enclosure and the panels were then cooled to about 200° F. at various rates for different panels, after which each panel was exposed to the air. The cooling from 1400° F. to about 400° F. in all cases required about half the total time and the cooling from 400° F. to 200° F. the remainder. Panels having the transparent enamel coat were free from delayed defects after a total cooling time of not more than 140 minutes. Panels having a white enamel coat could be cooled in as little as 40 minutes without showing delayed defects. Cooling periods longer than 140 minutes did not produce any improvement in respect to avoiding delayed defects.

Test panels treated by the procedures followed in the above examples showed no difference in appearance or in the stability of the enamel coating over long periods of time. Panels which had been acid-cleaned and were then subjected to the procedure of Example I required a period of about 100 minutes for the second-stage cooling in order to avoid delayed defects in transparent enamel, the exact time depending on whether the panels were enameled shortly after cleaning (½ hour) or not until after the lapse of several hours (4 to 6), the cooling time being inversely proportional to the time between cleaning and enameling. The cooling time may be reduced to around 75 minutes by heating the panels after cleaning and before coating at a temperature of about 230° F. for four hours.

Enameled ware may also be insured against the development of delayed defects by being given a prolonged heat treatment at a constant, suitably elevated temperature. If the newly fired ware is cooled from the enameling temperature to a chosen temperature in the range 400° F. to 750° F. and is "aged" or "soaked" at that temperature long enough, it can then be air-cooled to room temperature without the subsequent appearance of delayed defects. The results of this method are fully as good as those obtainable by the procedures of the invention set forth above, but as the required times of "ageing" are very much longer than those necessary in the controlled cooling of my invention, the ageing method is not economically feasible.

If ageing is sufficiently prolonged, not only are all delayed defects avoided, but also the phenomenon known as "reboiling" is eliminated.

I claim:

1. In a method of enameling, the steps including firing steel ware having a coating of dried enamel slip thereon, at a temperature above the fusion temperature of the slip residue, i. e., about 1500 to 1550° F. and, after fusion of the slip residue, cooling the ware in two successive stages, said cooling being carried out by transferring the ware from the firing zone to a cooling zone maintained at about 400° F. and allowing the ware to cool rapidly to approximately that temperature, then gradually and continuously cooling the ware from about 400° F. to about 200° F. by progressively lowering the temperature of the ware in the cooling zone at a controlled rate so that the last-mentioned cooling continues gradually over a period of from 20 to 60 minutes.

2. The method defined by claim 1 characterized by said first stage of cooling being effected by natural radiation and convection.

3. The method defined by claim 1 characterized by placing the ware in an enclosure during said second stage of cooling.

HENRY M. DAVIS.

REFERENCES CITED

The following references are of record in the file of this patent:

UNITED STATES PATENTS

| Number | Name | Date |
| --- | --- | --- |
| 193,669 | Neidringhaus | July 31, 1877 |